US005734680A

United States Patent [19]
Moore et al.

[11] Patent Number: 5,734,680
[45] Date of Patent: Mar. 31, 1998

[54] ANALOG IMPLEMENTATION OF A PARTIAL RESPONSE MAXIMUM LIKELIHOOD (PRML) READ CHANNEL

[75] Inventors: Charles E. Moore, Loveland, Colo.; Richard A. Baumgartner, Palo Alto, Calif.; Travis N. Blalock, Santa Clara, Calif.; Thomas M. Walley; Robert A. Zimmer, both of Loveland, Colo.; Rajeev Badyal, Ft. Collins, Colo.; Li Ching Tsai, Ft. Collins, Colo.; Larry S. Metz, Ft. Collins, Colo.; Sui-Hing Leung, Cupertino, Calif.; James S. Ignowski; Kenneth R. Stafford, both of Ft. Collins, Colo.; Ran-Fun Chiu, Los Altos; Richard A. Baugh, Palo Alto, both of Calif.

[73] Assignee: Hewlett-Packard Co., Palo Alto, Calif.

[21] Appl. No.: 513,188

[22] Filed: Aug. 9, 1995

[51] Int. Cl.$^6$ .................................................. H04L 5/12
[52] U.S. Cl. .................... 375/263; 375/262; 375/341; 371/43
[58] Field of Search .................. 375/262, 263, 375/265, 266, 290, 341; 371/43; 360/65

[56] References Cited

U.S. PATENT DOCUMENTS

| | | | |
|---|---|---|---|
| 4,571,734 | 2/1986 | Dolivo et al. | 375/18 |
| 4,638,191 | 1/1987 | Baumgartner et al. | 307/602 |
| 4,644,564 | 2/1987 | Dolivo et al. | 375/18 |
| 5,291,083 | 3/1994 | Blalock et al. | 307/607 |
| 5,448,583 | 9/1995 | Miyamoto et al. | 371/43 |
| 5,521,945 | 5/1996 | Knudson | 375/341 |
| 5,523,896 | 6/1996 | Park | 360/10.3 |

OTHER PUBLICATIONS

Sangster, F.L.J., "The Bucket-Brigade Delay Line; A Shift Register for Analogue Signals," Philips Technical Reivew, vol. 31, No. 4 (1970), pp. 97–110.

Ferguson, M.J., "Optimal Reception for Binary Partial Response Channels," The Bell System Technical Journal, vol. 51, No. 2 (Feb., 1972), pp. 493–505.

Berglund, C.N., and Boll, H.J., "Performance Limitations of the IGFET Bucket-Brigade Shift Register," IEEE Transactions on Electron Devices, vol. ED-19, No. 7 (Jul. 1972), pp. 852–860.

Denyer, P.B., et al., "A Monolithic Adaptive Filter," IEEE Jounral of Solid State Circuits, vol. SC-18, No. 3 (Jun., 1983), pp. 291–296.

Allen, P.E., and Holberg, D.R., *CMOS Analog Circuit Design*, Holt Rinehart & Winston, The Dreyden Press, Saunders Publishing, Orlando, FL (1987), pp. 227–239.

(List continued on next page.)

*Primary Examiner*—Stephen Chin
*Assistant Examiner*—Kevin Kim

[57] ABSTRACT

An analog, fully integrated, partial response maximum likelihood (PRML) read channel utilizing a high-performance analog delay line, an analog adaptive equalizer and an analog Viterbi detector is provided, resulting in saved space, performance gains, and lower power consumption. For signal detection and reconstruction used in read operations, the partial response maximum likelihood (PRML) read channel includes a variable gain amplifier coupled to a lowpass filter for input to an adaptive analog equalizer. The adaptive analog equalizer comprises an analog delay line and an analog feedforward equalizer (FFE). An analog Viterbi detector employs maximum-likelihood sequence estimation (MLSE) techniques to performs the signal detection function. A decoder/descrambler produces a final reconstructed signal. The analog implementation of a partial response maximum likelihood (PRML) read channel also includes a scrambler/encoder coupled to a write precompensation circuit for output to a separate write head.

22 Claims, 8 Drawing Sheets

OTHER PUBLICATIONS

Spencer, R.R., "Simulated Performance of Analog Viterbi Detectors," *IEEE Journal on Selected Areas in Communications*, vol. 10, No. 1, (Jan., 1992), pp. 281–288.

Tanaka, S., et. al., "An Adaptive Equalizing Maximum Likelihood Decoding LSI for Magnetic Recording Systems," ISSCC Digest of Technical Papers (Feb., 1993), pp. 220–221.

Philpott, R., et al., "A 7MB/sec (65 MHz), Mixed Signal, Magnetic Recording Channel DSP Using Partial Response Signaling With Maximum Likelihood Detection," CICC Digest of Technical Papers (May, 1993), pp. 10.4.1–10.4.4.

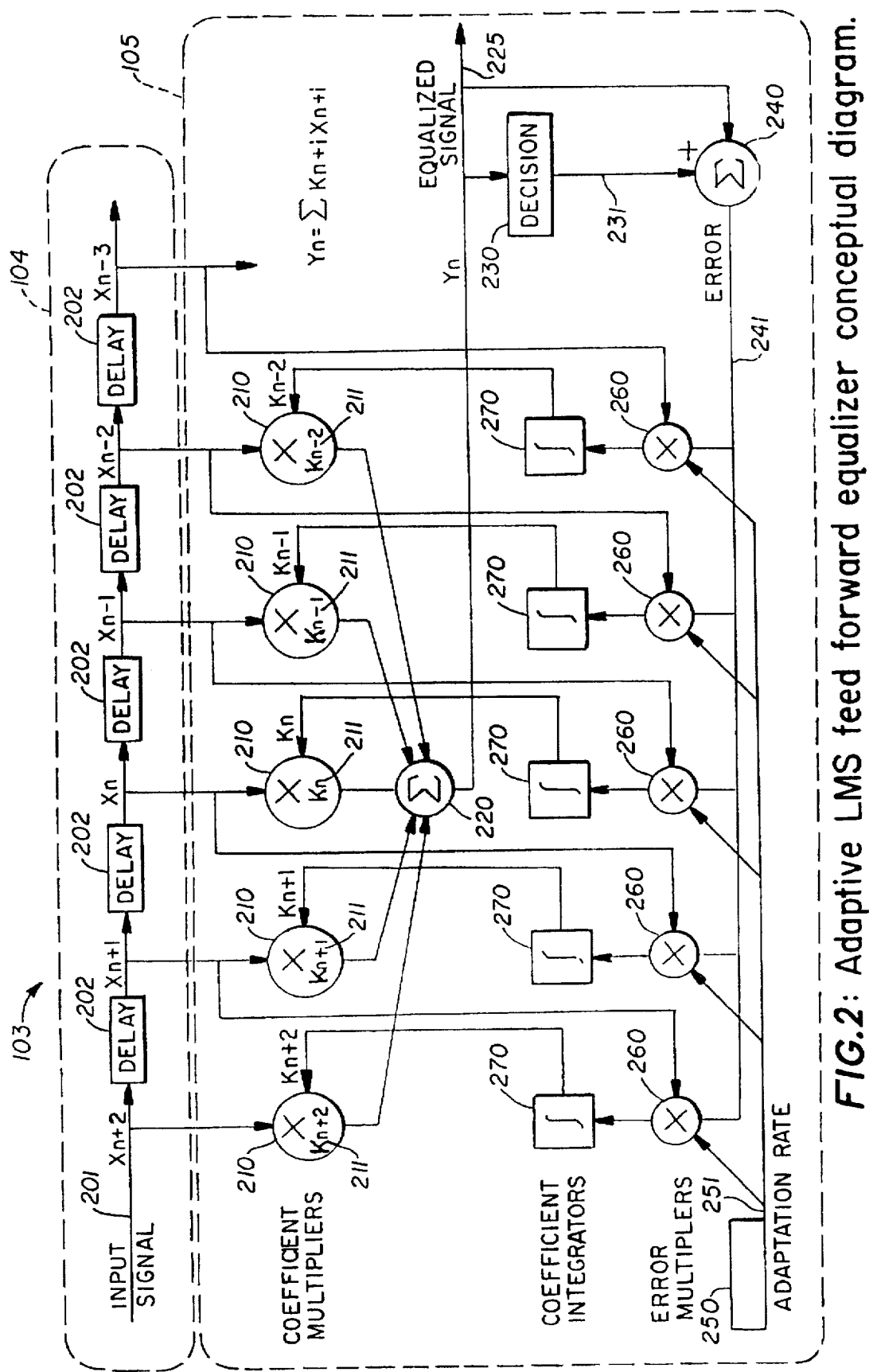
*FIG.2*: Adaptive LMS feed forward equalizer conceptual diagram.

```
IF (X(I) > X(0) && X(I) > X(2)) THEN
    PHASE ERROR = K(X(2) - X(0))
ELSE IF (X(I) < X(0) && X(I) < X(2)) THEN
    PHASE ERROR = K(X(2) - X(0))
ELSE
    PHASE ERROR = 0
END IF
```

ANALOG IMPLEMENTATION OF A PARTIAL RESPONSE MAXIMUM LIKELIHOOD (PRML) READ CHANNEL

FIELD OF THE INVENTION

The present invention relates to analog read/write channels for magnetic media devices, and more particularly to an integrated, fully analog, partial response maximum likelihood detection system which utilizes an analog adaptive equalizer and an analog Viterbi detector.

BACKGROUND OF THE INVENTION

In the magnetic recording device industry, read/write channels have historically been implemented using continuous-time, analog peak detect approaches for signal detection. These techniques were developed further to include partially integrated circuits with analog peak detectors and other digital circuit elements to improve certain functional aspects of the read channel.

Included among the improved functional aspects of the read channel has been the development of Maximum-Likelihood Sequence Estimation (MLSE) techniques, and in particular, the Viterbi detector, to provide a simplified, reliable, high-speed decoder ideal for use in partial response systems.

Magnetic read channels are inherently partial response (PR) in nature due to the ternary characteristics (0, ±1) of the line codes used for signal transmission. In a magnetic recording device, data is recorded by changing the direction of the magnetic field of the particles on the media. During a read operation, a read head passes over the media, producing an output voltage corresponding to detected changes in flux caused by transitions in the magnetic field direction. The signal detected by the read head is typically non-return-to-zero (NRZ) data, whereby no change in the direction of the magnetic field results in an output voltage of 0, and a change in magnetic field direction results in an output voltage of ±1 (i.e., the opposite voltage from the previous transition). PR channels are characterized by polynomials of the form $P(D) = (1-D)$, where D is the delay operator corresponding to the z transform of the discrete-time impulse response, $z^{-1}$, which in turn corresponds to a one-bit time delay. Due to the simplicity in building the detector, a PR4 response characterized by $P(D)=(1-D^2)$, or an extended PR4 response characterized by $P(D)=(1+D)^n(1-D)$, where n=2, 3, . . . , is typically used.

Maximum-likelihood detectors operate by receiving a sampled signal and selecting a known signal closest in similarity to the received sample for output. This greatly reduces the effect of intersymbol interference since it produces a clean version of the received signal. Further, since it operates as an effective error filter, for digital data it reduces the number of error bits required for error detection, and thus increases the storage capacity of the media.

The Viterbi algorithm is a very effective maximum-likelihood sequence estimator which eliminates the need to store all the known incoming signals for comparison and subsequent reproduction. Instead, the Viterbi algorithm operates on the principal that the likelihood of being in a state at time k is only a function of the likelihoods for the states at time k-1 and the branch metrics from time k-1 to time k. A detailed description of the Viterbi algorithm is given in Spencer, R. R., "Simulated Performance of Analog Viterbi Detectors", IEEE *Journal on Selected Areas in Communications*, Vol. 10, No. 1, pp. 281-288 (January 1992). Representative digital implementations of the Viterbi detector may be found in U.S. Pat. No. 4, 644, 564, to Dolivo, et al., and in U.S. Pat. No. 4,571,734, to Dolivo, et al.

Read channels utilizing partial response signalling with maximum likelihood detection (PRML) have recently become popular. Representative implementations of PRML read channels for magnetic recording devices may be found in Philpott, R., et. al., "A 7 MB/sec (65 MHz), Mixed-signal, Magnetic Recording Channel DSP Using Partial Response Signaling with Maximum Likelihood Detection", *CICC Digest of Technical Papers*, pp. 10.4.1–10.4.4 (May 1993), and in Tanaka, S., et. al., "An Adaptive Equalizing Maximum Likelihood Decoding LSI for Magnetic Recording Systems", *ISSCC Digest of Technical Papers*, pp. 220–221 (February 1993). These approaches utilize partially integrated circuits which are inherently digital due to the operation of the Viterbi detector as a sampling detector. Using such methods, superior error rate performance may be achieved compared to peak detect channels. Despite its benefits, however, the conventional PRML read channels require significant power and relatively complex circuitry, resulting in greater cost and surface area requirements and limited read/write speeds.

SUMMARY OF THE INVENTION

The present invention overcomes the aforementioned disadvantages by allowing complete integration of all functional aspects of a read channel onto one single compact integrated circuit. Saved space, performance gains, and lower power consumption result from the completely analog implementation of a partial response maximum likelihood (PRML) read channel, which utilizes a high-performance analog delay line with negative feedback, an analog adaptive equalizer, and an analog Viterbi detector. Each of these functional elements contributes in a deliberate fashion to achieve the performance, power consumption and die area advantages embodied in the present invention.

A analog implementation of a partial response maximum likelihood (PRML) read channel is provided comprising a variable gain amplifier, a lowpass filter, an adaptive analog equalizer, a Viterbi detector, a decoder/descrambler, and a read clock recovery circuit 112. The adaptive analog equalizer comprises an analog delay line and an analog feedforward equalizer (FFE). In the preferred embodiment, the adaptive analog equalizer is implemented using a high-performance analog delay line with negative feedback and an analog implementation of a finite impulse response (FIR) filter. The Viterbi detector employs maximum-likelihood sequence estimation (MLSE) techniques, utilizing the partial response nature of the channel to achieve high performance, reliability, low bit error rates, and reduced space-consumption.

In addition, the analog implementation of a partial response maximum likelihood (PRML) read channel includes a scrambler encoder and a write precompensation circuit for write operation capability.

BRIEF DESCRIPTION OF THE DRAWING

An illustrative and presently preferred embodiment of the invention is shown in the accompanying drawings in which:

FIG. 2 is a schematic block diagram of the preferred analog implementation of the adaptive equalizer illustrated in FIG. 1.

DETAILED DESCRIPTION OF THE INVENTION

Figure 1:
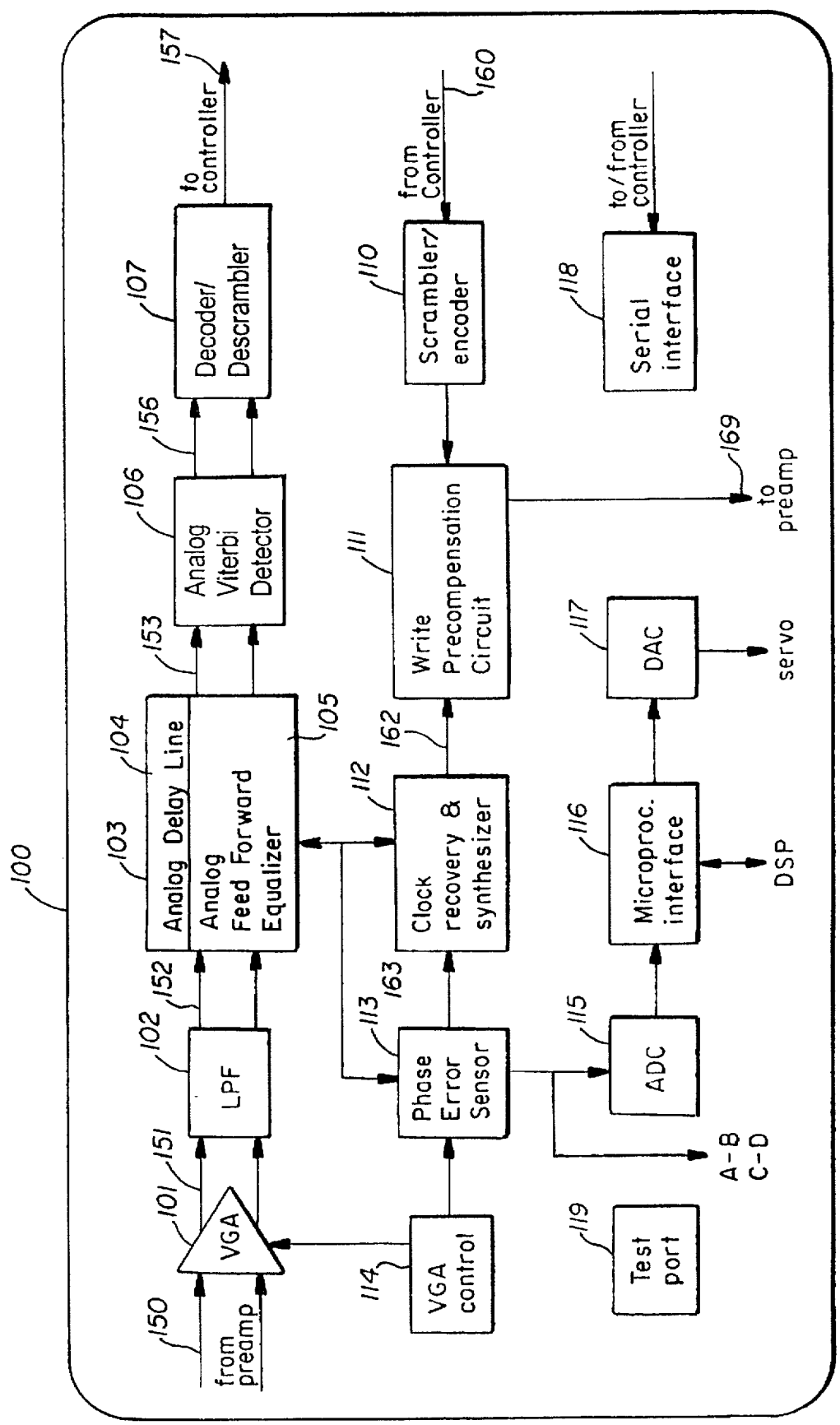
FIG. 1 is a functional block diagram of the present invention.

Turning now in detail to the drawing, FIG. 1 shows a block diagram of the analog implementation of a partial response maximum likelihood (PRML) read channel 100 according to the present invention.

For read operations, a magnetic signal present on a magnetic media is detected by a read head (MR or inductive), operating in a device such as a magnetic disk drive, for conversion to an electronic signal. A separate preamplifier, not shown, amplifies the electronic signal to a level suitable for input to the partial response maximum likelihood (PRML) read channel 100. A variable gain amplifier 101 receives the incoming preamplified signal 150, and adaptively amplifies it to maintain a signal level within the range required for input to a lowpass filter 102. The lowpass filter 102 removes the channel noise from the adjusted gain signal 151 for input to an adaptive analog equalizer 103. The adaptive analog equalizer 103, comprising an analog delay line 104 and an analog feedforward equalizer (FFE) 105, reshapes the filtered signal 152, filtering it to a known expected impulse response for input into an analog Viterbi detector 106. The analog Viterbi detector 106 receives the equalized signal 153 and, using a maximum-likelihood sequence estimation (MLSE) techniques, performs the signal detection function. A decoder/descrambler 107 unscrambles the detected signal 156 received from the analog Viterbi detector 106 and decodes it into frames to produce the reconstructed signal 157.

During write operations, input data 160 is received from a separate controller by a scrambler encoder 110, which adds the preamble and synchronization information, scrambles and encodes the input data 160 to produce an encoded signal. A write precompensation circuit 111 receives the encoded signal 161, along with a write synchronization signal 162 from a write clock synthesizer circuit 420, part of the clock recovery and synthesis circuit 112, and delays or advances the time at which a data bit transition is sent to the write head according to the value of the previous two bits in order to correct for magnetic domain wall interactions (non-linear ISI). The precompensated write signal is sent to a separate write head for inscribing the magnetic media.

FIG. 2 illustrates additional detail of the adaptive analog equalizer 103 as implemented in the preferred embodiment of the invention. It will be noted that analog equalizers are conventionally implemented using frequency domain techniques since, when the Fourier transform is taken of required time-domain operations, a more easily realizable operation may result in the frequency domain. It will also be noted that these techniques are typically not adaptive. In the preferred embodiment, however, an analog equalizer 103 is implemented using time domain techniques, and is also adaptive. In the time domain, the desired response is more clearly and simply defined. For example, for PR4 channels, the desired time domain response is $P(D)=(1-D^2)$, whereas the corresponding frequency domain response, $P(omega)=(1-e^{2*tau*j*omega})$, is less clean. It is possible to get more accurate equalization using the time domain. More accuracy translates to better SNR, which gives a lower error rate. Thus, the preferred embodiment of the adaptive analog equalizer 103 utilizes time domain techniques, and specifically, the preferred embodiment encompasses an analog implementation of a finite impulse response (FIR) filter, which is traditionally reserved for digital implementation.

As shown in FIG. 2, the adaptive analog equalizer 103 comprises two stages: an analog delay line 104 and an analog feedforward equalizer (FFE) 105.

The analog delay line 104 comprises a plurality of cascaded delay circuit elements which receive an incoming analog signal 201 (from the lowpass filter 102, FIG. 1), each element introducing an incrementally longer delay to the incoming analog signal. The analog delay line 104 samples the incoming analog signal 201 and holds and delays discrete successive representations of the values of the incoming analog signal 201 for input to the discrete time analog feedforward equalizer (FFE) 105. Representative delay lines contemplated for use in the preferred embodiment are discussed in U. S. Pat. No. 4,638,191 to Baumgartner, et. al.

Figure 3A:
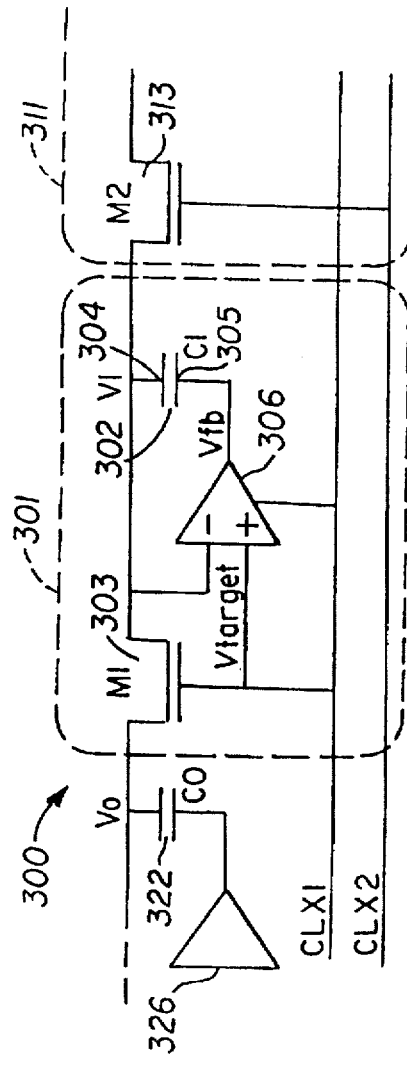
FIG. 3A is a schematic block diagram of the preferred implementation for delay line illustrated in FIG. 1 using a bucket brigade topology.

In the preferred embodiment, the analog delay line is implemented in accordance with U.S. Pat. No. 5,291,083 to Blalock et. al., based on a bucket brigade analog delay line with voltage limiting feedback, and is incorporated by reference herein. FIG. 3A shows a simplified schematic of a bucket brigade analog delay line with voltage limiting feedback 300. The bucket brigade analog delay line with voltage limiting feedback 300 provides the benefits attributable to a conventional bucket brigade delay line including a relatively simple design, compact topology and low power consumption. The enhanced bucket brigade analog delay line with voltage limiting feedback 300, however, is preferred due to its additional benefits of faster speed resulting from faster turnoff of the charge transfer devices and thus having faster settling times, error elimination resulting from high output impedances of the transfer device, and prevention of overvoltage conditions resulting in a longer life of the charge transfer devices. Thus, in FIG. 3A, a representative delay stage 301, circumscribed by the dotted line, comprises a charge holding storage capacitor 302 for holding either a signal charge or a reference charge, a charge transfer device 303 for transferring charge from one stage to another at regular clock intervals, a tap circuit 310 for allowing external sampling of the propagated input signal, and a negative feedback amplifier 306 for maintaining the drain terminal 304 of the charge transfer device 303 at a constant potential during charge transfer, thereby eliminating errors caused by finite output impedance of the charge transfer device 303 and preventing overvoltage conditions which could result in failure of the charge transfer device 303. In addition, the bucket brigade analog delay line with voltage limiting feedback 300 utilizes ramped clock pulse shaping to greatly reduce settling time, thus enabling high speed operation. The negative feedback amplifier 306 also enables the use of a high speed tap circuit which eliminates the 'dead' time between shift pulses typically needed to access internal values of the delay line stages.

In operation, the output of the negative feedback amplifier 306 is used to make a copy of the charge on the charge transfer device C1 303 in a separate hold capacitor Chold (not shown). At the next shift cycle, the charge holding storage capacitor C1 302 is charged by the charge transfer device M2 313 of the previous representative delay stage 311 while Chold maintains the signal voltage for a full half cycle.

Figure 3B:
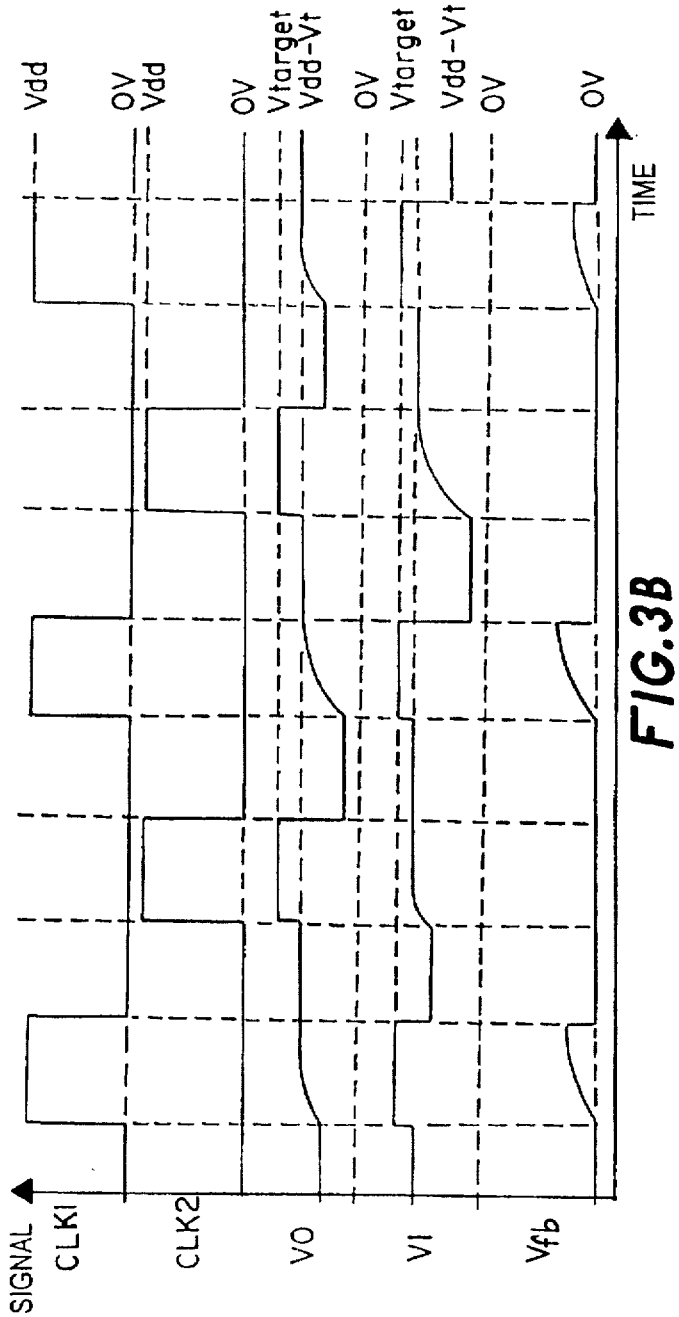
FIG. 3B is a timing diagram depicting the operation of the delay line illustrated in FIG. 3A.

FIG. 3B shows the waveforms illustrating the operation of the bucket brigade analog delay line with voltage limiting feedback 300. When the clock signal CLK1 is driven to 5V, the negative feedback amplifier 306 is enabled and adjusts the potential Vfb on the negative node 305 of the charge holding storage capacitor 302 as necessary to keep the voltage V1 at the drain terminal 304 at a constant potential, Vtarget. The feedback voltage Vfb is driven positive as the charge holding storage capacitor C1 302 discharges into the charge holding storage capacitor C0 322. Since the charge transfer devices are preferably enhancement type FETs, keeping the drain voltage equal to the gate voltage is sufficient for maintaining the charge transfer device 303 in the active region during charge transfer. When CLK1 returns to ground, the clocked amplifier is disabled and drives Vfb to ground. In the preferred embodiment, the bucket brigade analog delay line with voltage limiting feedback 300 is implemented with eleven delay line stages for input to the twelve-tap analog feedforward equalizer (FFE) 105.

Figure 4A:
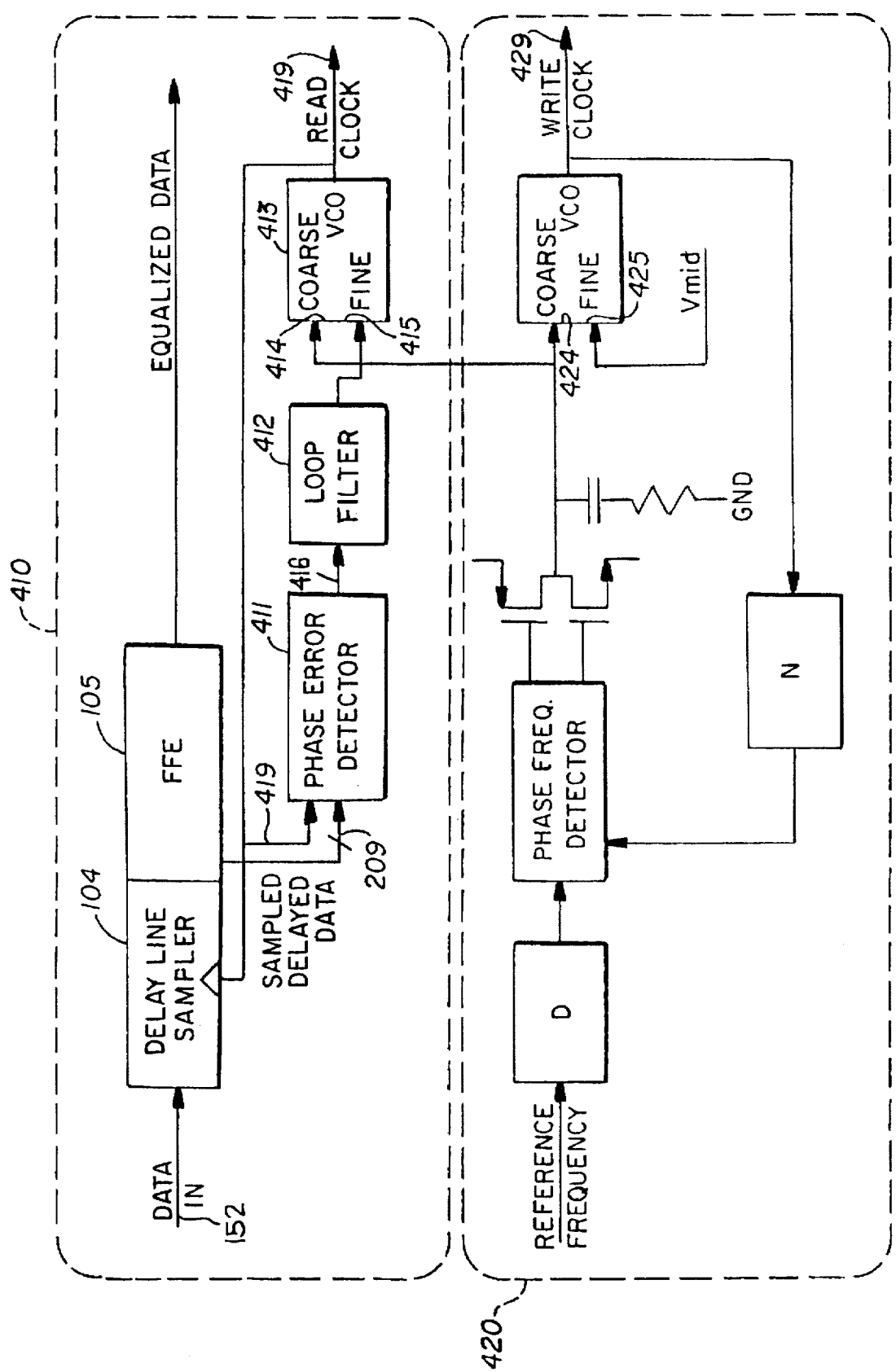
FIG. 4A is a schematic block diagram of the clock recovery and synthesizer circuit illustrated in FIG. 1.

FIG. 4A shows additional detail of the clock recovery and synthesis circuit 112, which comprises two parts: a read clock recovery circuit 410 and a write clock synthesizer circuit 420. The write clock synthesizer circuit 420 will be discussed in conjunction with the write path discussion.

As seen in FIG. 4A, the read clock recovery circuit 410 utilizes conventional phase-locked loop clock recovery techniques, and comprises a phase error detector 411, a loop filter 412 and a voltage controlled oscillator (VCO) 413. The voltage controlled oscillator (VCO) 413 used in the preferred embodiment has both coarse 414 and fine 415 frequency control inputs. The write clock synthesizer circuit 420 generates the input to coarse frequency control input 414 on the read VCO 413 and, being the same frequency that signals are written to the media, is the expected frequency of the signals coming off the media. Setting the coarse frequency control input 414 to the write frequency pre-tunes the read VCO 413 to at least close to the actual read signal frequency. Thus, the read clock recovery circuit 410 need only fine-tune the frequency of the read VCO 413 via the fine frequency control input 415 to correct for variations in disc rotation speed and small differences between the read VCO 41 3 and the write VCO 423 due to process tolerances; it also adjusts the phase for best sampling.

Figure 4B:
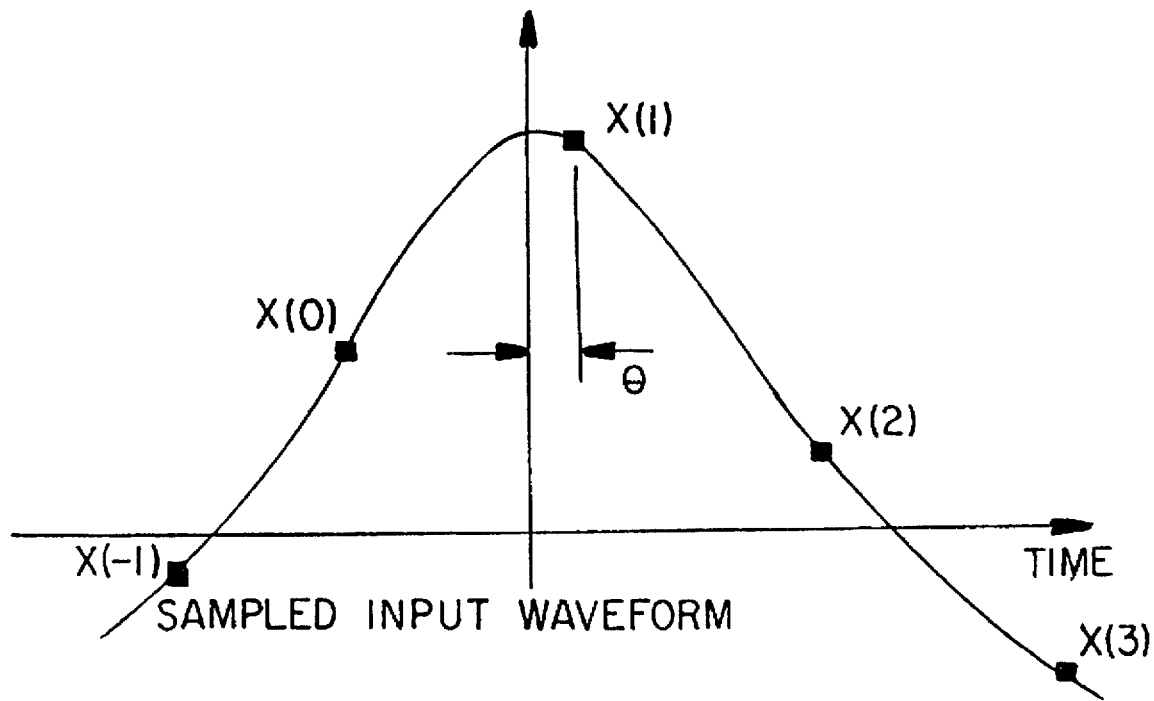
FIG. 4B illustrates a phase error diagram for a sampled input waveform along with the resulting phase detector operation for the clock recovery circuit of FIG. 4A.

In FIG. 4A and FIG. 4B, the phase error detector 411 infers the phase at which the filtered signal 152, Data In, was sampled and generates a phase error signal 416, proportional to the difference between the inferred phase and the optimum sampling phase. The inference is on the average correct but makes many errors, generating high frequency noise which is filtered in the loop filter 412. The loop filter 412 also maintains a fixed phase relationship between the reference and VCO signals, which reduces the capture range and increases capture time. The filtered phase error signal 417 produced by the loop filter 412 is input to the fine frequency control input 415 on the read VCO 413, which adjusts the output VCO frequency up or down according to the input filtered phase error signal 417. The read clock signal 419 output by the read VCO 413 becomes closer and closer to the frequency of the input delayed sampled signal 209 until it becomes locked to the frequency of the delayed sampled signal 209, thereby recovering the clock signal directly from the data signal itself.

The read clock signal 419 is phase locked by making sure that the analog delay line 104 samples the centers of peaks in the incoming analog signal 201. As shown in FIG. 4B, three consecutive samples from the analog delay line 104 are looked at to determine the phase error. This approach is independent of the analog feedforward equalizer (FFE) 105 filtering so the read clock recovery circuit 410 can be phase locked before the analog feedforward equalizer (FFE) 105 is optimized. Also, since the analog feedforward equalizer (FFE) 105 can correct for phase error and is independent of the phase error detector 411, a small offset in one loop will not cause a steady drift in phase error. This approach allows less delay than one which operates on data that must first pass through the analog feedforward equalizer (FFE) 105, resulting in better loop stability or a faster loop.

The second stage of the adaptive analog equalizer 103 is the analog feedforward equalizer (FFE) 105, as illustrated in FIG. 2 and circumscribed by a dotted line. The analog feedforward equalizer (FFE) 105 restores the high-frequency components which were attenuated and distorted due to the limited transmission bandwidth of the channel. Unlike the digital programmable equalizers typically used in PRML channels, the preferred embodiment implementation of the analog feedforward equalizer (FFE) 105 is both analog and adaptive. Since PRML techniques operate on samples of the received signal instead of the entire continuous-time signal, PRML sampling detectors and their accompanying equalizers are usually thought of as digital, and accordingly, are usually implemented using digital technology. Analog techniques are feasible in the present invention, however, due to the low resolution required to achieve optimal performance by a Viterbi detector in a partial response system. In fact, only a resolution of 5 or 6 bits is necessary to achieve optimal performance with a Viterbi detector. Thus, analog circuits are sufficient for use not only in the Viterbi detector implementation, but also in the equalizer implementation. For certain operations, analog circuits are faster and require fewer circuit components. For each of the operations involved in the implementation of the Viterbi detector and equalizer (namely, summation, comparison, multiplication, switching, storage, and integration), analog circuits can perform the operation directly with less circuitry components and less delay. For example, in a digital implementation, stored samples must first be quantized by a digital-to-analog converter (DAC) and then sent to a register; in an analog implementation, the samples may be stored directly in a track-and-hold (T/H) circuit as analog values. Thus, analog implementations have the added advantage over digital implementations of speed, less circuitry components, lower power consumption, and less cost.

In addition, digital equalizers are usually implemented as programmable rather than adaptable; that is, unlike programmable equalizers which allow tap coefficient adjustment through programmable parameters, adaptive equalizers allow continuous self-correcting adjustment of the tap coefficients as the signal is processed.

FIG. 2 illustrates the preferred embodiment of the analog feedforward equalizer (FFE) 105. It will be noted that analog equalizers are conventionally implemented using frequency domain techniques. This results since required time domain operations may translate via the Fourier transform to more easily realizable frequency domain operations.

In the preferred embodiment of the analog feedforward equalizer (FFE) 105 illustrated in FIG. 2, the delayed sampled signal 209 is received from the analog delay line 104. The analog feedforward equalizer (FFE) 105 comprises a set of adjustable-coefficient multipliers, each adjustable-coefficient multiplier 210 receiving one delayed representation 209 of the incoming analog signal 201, such that the number of adjustable-coefficient multipliers 210 required for the implementation of the analog feedforward equalizer (FFE) 105 is equal to the sample resolution (i.e., the number of discrete analog samples). Each adjustable-coefficient multiplier 210 multiplies its delayed sampled signal 209 by its corresponding weighting coefficient Kn 211. The weighting coefficients Kn 211 are input to each adjustable-coefficient multiplier 210 from associated coefficient integrators 270, which store the analog weighting coefficients Kn 211 and are adjusted (adapted) by charging or discharging the coefficient integrators 270 by means of associated error multipliers 260. The resulting products are then summed by a summer 220 to generate the equalized signal 225 for each discrete time point. The output equalized signal 225 becomes input to the analog Viterbi detector 106.

The analog feedforward equalizer (FFE) 105 of the preferred embodiment is also adaptive (i.e., it automatically self-corrects by updating the weighting coefficients 211 according to a calculated error signal). For frequency domain equalizers, there is no easy way to perform the algorithm for adaption, and thus adaption is typically not implemented. The preferred embodiment of the analog feedforward equalizer (FFE) 105, being implemented in the time domain, however, is more easily able to perform the adaption algorithm. Thus, the additional circuitry required for adaptive equalization is implemented in the preferred embodiment.

Accordingly, in addition to being sent to the Analog Viterbi detector 106, the equalized signal 225 also becomes input to a decision circuit 230 which quantifies the input equalized signal 225 to generate a quantified signal 231. A comparator circuit 240 computes the difference between the equalized signal 225 and the quantified signal 231 to generate an error signal 241. The error signal 241 is fed into an adaption rate multiplier 250 to generate an adaption rate signal 251. The rate at which the weighting coefficients Kn 211 adapt is set by a control register value which uses a digital to analog converter to adjust the adaption rate signal 251. The adaption rate signal 251 is fed into a set of error multipliers 260, each error multiplier 260 corresponding to a single adjustable-coefficient multiplier 210. Each error multiplier 260 receives the error signal 241 from the comparator circuit 240, and the input delayed sampled signal 209 of its succeeding delay stage from the analog delay line 104, and multiplies them by the adaption rate signal 251 generated by the adaption rate multiplier 250. Each error multiplier 260 is directly coupled to one each of the coefficient integrators 270. The current available from each error multiplier 260 charges each corresponding coefficient integrator 270. The weighting coefficients Kn 211 are represented by voltages on the coefficient integrators 270 which integrate the various least mean square error terms.

In the preferred embodiment, the signal path adjustable-coefficient multipliers 210, summer 220, decision circuit 230, and comparator circuit 240 all employ current mode techniques. The input to the summer 220 employs an active feedback cascode circuit to maintain an input impedance of less than 30 Ohms to provide accurate high speed summation of the current signals from the adjustable-coefficient multipliers 210. The decision circuit 230 comparators utilize cross-coupled inverter pairs for fast resolution of the signal state.

Turning back to FIG. 1, after equalization by the analog feedforward equalizer (FFE) 105, the equalized signal 153 is sent to an analog Viterbi detector 106. The analog Viterbi detector 106 operates on a partial response (PR) communication channel and employs a maximum-likelihood sequence estimation (MLSE) algorithm for signal detection, using the sample-to-sample correlation inherent in the signal to achieve a low bit error rate in the presence of noise and to increase the data rate for a given channel bandwidth without signal-to-noise ratio (SNR) degradation.

A representative analog Viterbi detector suitable for implementation in the preferred embodiment is described in Spencer, R. R., "Simulated Performance of Analog Viterbi Detectors", *IEEE Journal on Selected Areas in Communications*, Vol. 10, No. 1, pp. 281–288 (January 1992). In the preferred embodiment, the Viterbi detector is implemented using an analog P(D)=(1−$D^2$) (class IV or PR4 response) configuration using current mode circuitry. The analog Viterbi detector 106 receives the equalized signal 153 from the analog feedforward equalizer (FFE) 105, and using the maximum likelihood sequence estimation algorithm, detects the signal by determining the class to which the incoming signal belongs.

Figure 6:
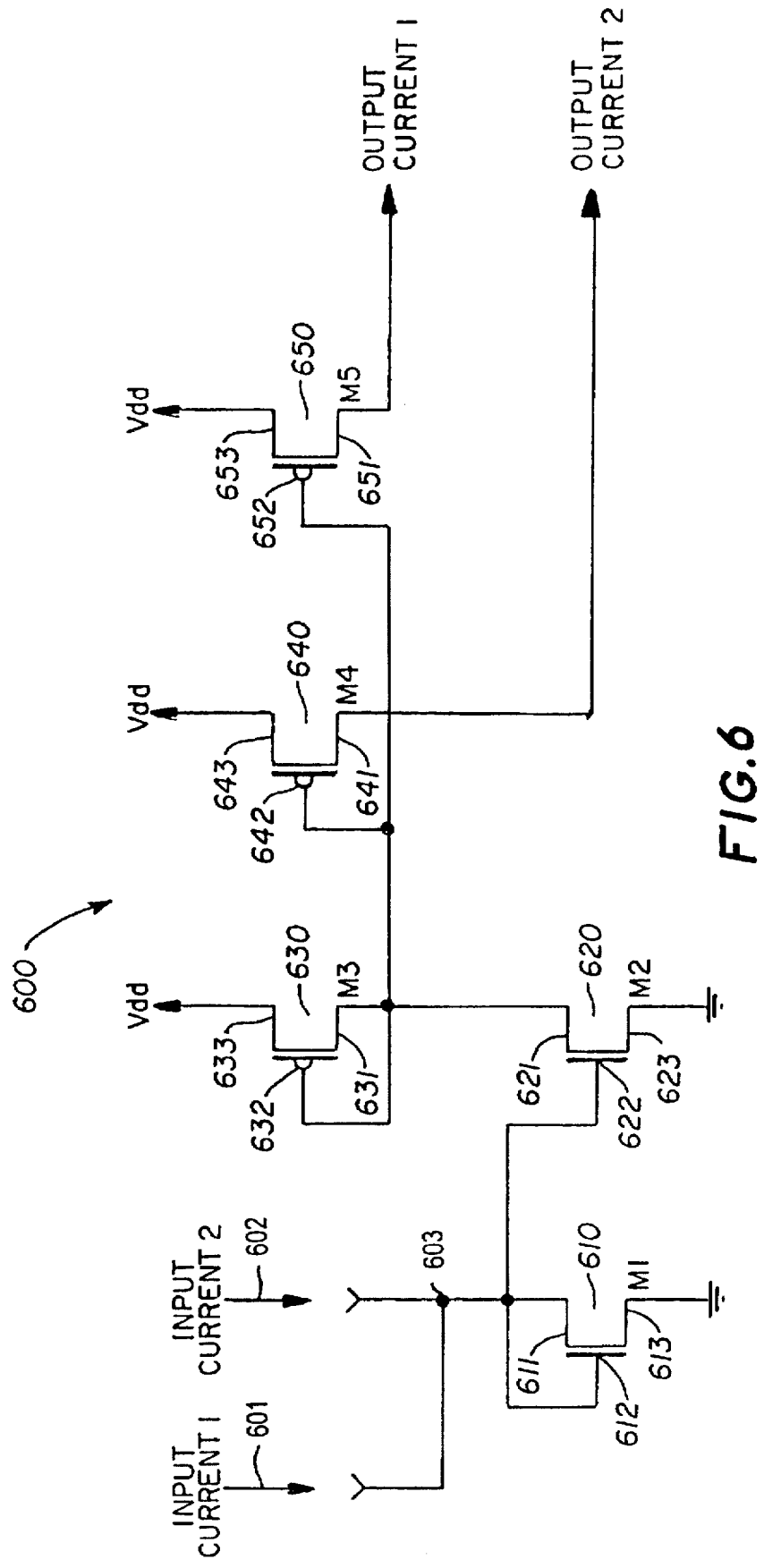
FIG. 6 is a schematic diagram of the basic current mode circuit used in the implementation of the analog Viterbi detector.

FIG. 6 shows the basic current mode circuit 600 used for implementing the various functional blocks of the analog Viterbi detector of the preferred embodiment. The current mode circuit of FIG. 6 performs two basic functions; namely, current summation and multiple output driver duplication. Traditionally, summation is performed using voltage mode techniques with operational amplifiers and resistors. However, since current mode circuits utilize only transistors, they are considerably faster and less space-consuming. The drawback is that unlike voltage mode circuits, which can drive multiple outputs, current mode circuits must duplicate the output current for each output it drives.

Referring to FIG. 6, the summation is achieved with NFET devices M1 610 and M2 620, while PFET devices M3 630, M4 640, and M5 650 provide the summed output. As seen in FIG. 6, the current mode circuit 600 receives Input Current 1 601 and Input Current 2 602, which are summed at summation node 603 to produce a current:

$$I_{SUM} = I_{Input\ Current\ 1} + I_{Input\ Current\ 2}.$$

The summation node 603 is connected to both the gate M1$_g$ 612 and drain M1$_d$ 611, of the first NFET M1 610. Since the gate of a MOS transistor conducts essentially no current, all of the $I_{SUM}$ flows into the drain M1$_d$ 611 of M1 610. The source M1$_s$ 613 of M1 610 and the source M2$_s$ 623 of M2 620 are both at the same (ground) potential. Likewise the gate M1$_g$ 612 of M1 610 and gate M2$_g$ 622 of M2 620 are electrically connected together so as to be at the same potential. If M1 610 and M2 620 have closely matched transistor parameters and geometries, which is easily achieved for transistors in close proximity on an integrated circuit, they also have equal gate-to-source potentials such that $V_{gsM1} = V_{gsM2}$. Whenever both M1 610 and M2 620 have drain potentials which bias them into the saturated region of operation, a condition easily obtained, the current $I_{dM2}$ in the drain of M2 620 is approximately equal to the current $I_{dM1}$ in the drain of M1, or $I_{SUM}$, and the summation function is achieved.

The duplication function is provided by PFET devices M3 630, M4 640, and M5 650. By a similar argument as that above, all of the current $I_{dM2}$ will flow through the drain $M3_d$ 631 of M3 630. In turn, provided that the transistor parameters and geometries are closely matched, the current $I_{dM4}$ in the drain $M4_d$ 641 of M4 640 and the current $I_{dM5}$ in the drain $M5_d$ 651 of M5 650 will be approximately equal to the current $I_{dM3}$ in the drain $M3_d$ 631 of M3 630.

Thus the output current(s) are equal to the summation of the input currents times a gain factor dependent only on the matched parameters and geometries of the relevant transistors. Additional PFET devices may be added to the basic current mode circuit and configured in the same manner as PFET devices M4 640 and M5 650 where additional output drivers are necessary. The basic current mode circuit, operation, and analysis is described in Allen, Philip E., and Holberg, Douglas R., *CMOS Analog Circuit Design*, Holt, Rinehart & Winston, Orlando, Fla. (1987), pp. 227–239.

Figure 7:
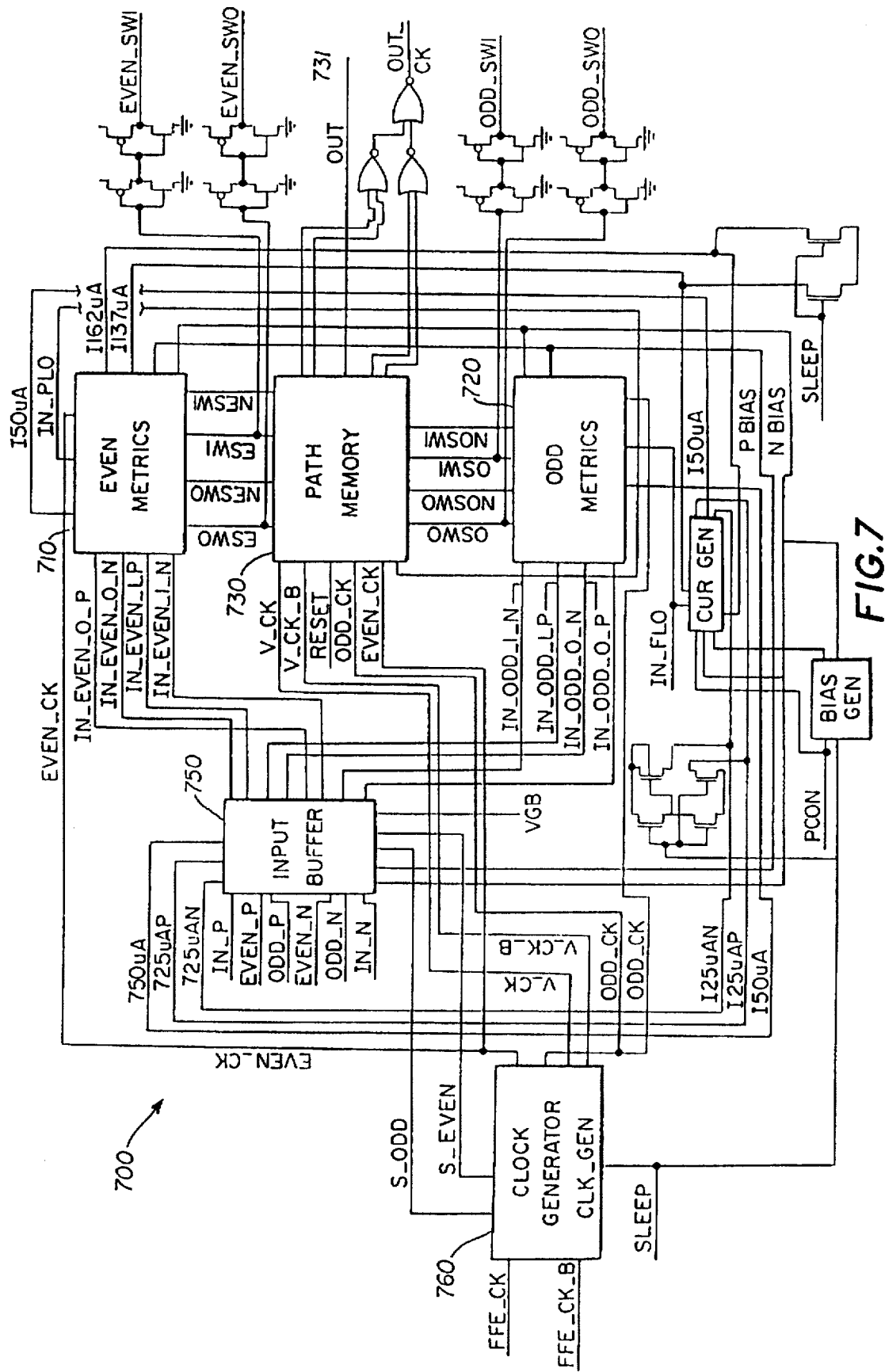
FIG. 7 is a schematic block diagram of the preferred analog implementation of the Viterbi detector illustrated in FIG. 1.

FIG. 7 is a schematic block diagram for an example analog Viterbi detector 700 used in the preferred embodiment. As shown in FIG. 7, an input buffer 750 receives and separates the incoming signal into an even metrics path signal and an odd metrics path signal according to half-frequency even and odd clock signals generated by a clock generator circuit 760. The even metrics path signal, output at half the frequency of the incoming signal, is fed to an even path metrics calculation circuit 710; likewise, the odd metrics path signal, also output at half the frequency of the incoming signal, is fed to an even path metrics calculation circuit 720. The even path metrics calculation circuit 710 and the odd path metrics calculation circuit 720 measure the proximity of the input signal to one of three levels (1, −1, or 0), based on the current and past metrics to produce an even metrics signal and an odd metrics signal. A path memory circuit 730 receives the even metrics signal from the even path metrics calculation circuit 710 and the odd path metrics calculation circuit 720, and combines the metrics to produce a maximum-likelihood signal 731 at its output. While illustrative of the preferred embodiment, the analog Viterbi detector 106 used in the present invention may be implemented according to any technique which provides analog input and output, and meets the proper speed, power consumption and size requirements.

Once the signal has been detected by the analog Viterbi detector 106, a decoder/descrambler 107 unscrambles the detected signal 156 and decodes it from its binary transmission code to its corresponding frame-by-frame code, or reconstructed signal 157. The preferred embodiment supports both 8/9 and 16/17 frame-by-frame codes.

For write operations, the analog implementation of a partial response maximum likelihood (PRML) read channel 100 receives input data 160 from a separate controller encoded in a frame-by-frame code. A scrambler/encoder 110 receives the frame-by-frame coded signal, and transforms it to a duobinary signal. In duobinary signaling, a 0 is transmitted by no pulse, and a 1 is transmitted by a pulse p(t) or −p(t), depending upon the polarity of the previous pulse and the number of 0's between them. In addition, the scrambler/encoder 110 also scrambles the signal to remove any long strings of 0's or 1's. The encoded scrambled signal is then sent to a write precompensation circuit 111.

As earlier mentioned, and referring back to FIG. 4A, the clock recovery and synthesis circuit 112 also comprises a write clock synthesizer circuit 420. The write clock synthesizer circuit 420 is a conventional N/D phase lock loop synthesizer with external components determining the loop filter characteristics. An unusual characteristic is that the write voltage controlled oscillator (VCO) 423 has two inputs, coarse 424 and fine 425 frequency control. The fine frequency control input 425 is permanently set to the center of its range and the loop uses the coarse frequency control input 424 only.

The analog feedforward equalizer (FFE) 105 in the preferred embodiment is designed to handle the linear intersymbol interference (ISI). Thus, write precompensation as used in conventional read/write channels is not needed for this reason. However, the analog feedforward equalizer (FFE) 105 is not designed to handle any non-linear intersymbol interference resulting from magnetic domain wall interactions. To correct for non-linear intersymbol interference in the preferred embodiment, the time at which a data bit transition is sent to the write head can be advanced or delayed by any one of four different programmable amounts, depending on which of the last two possible transitions actually were transitions.

Figure 5:
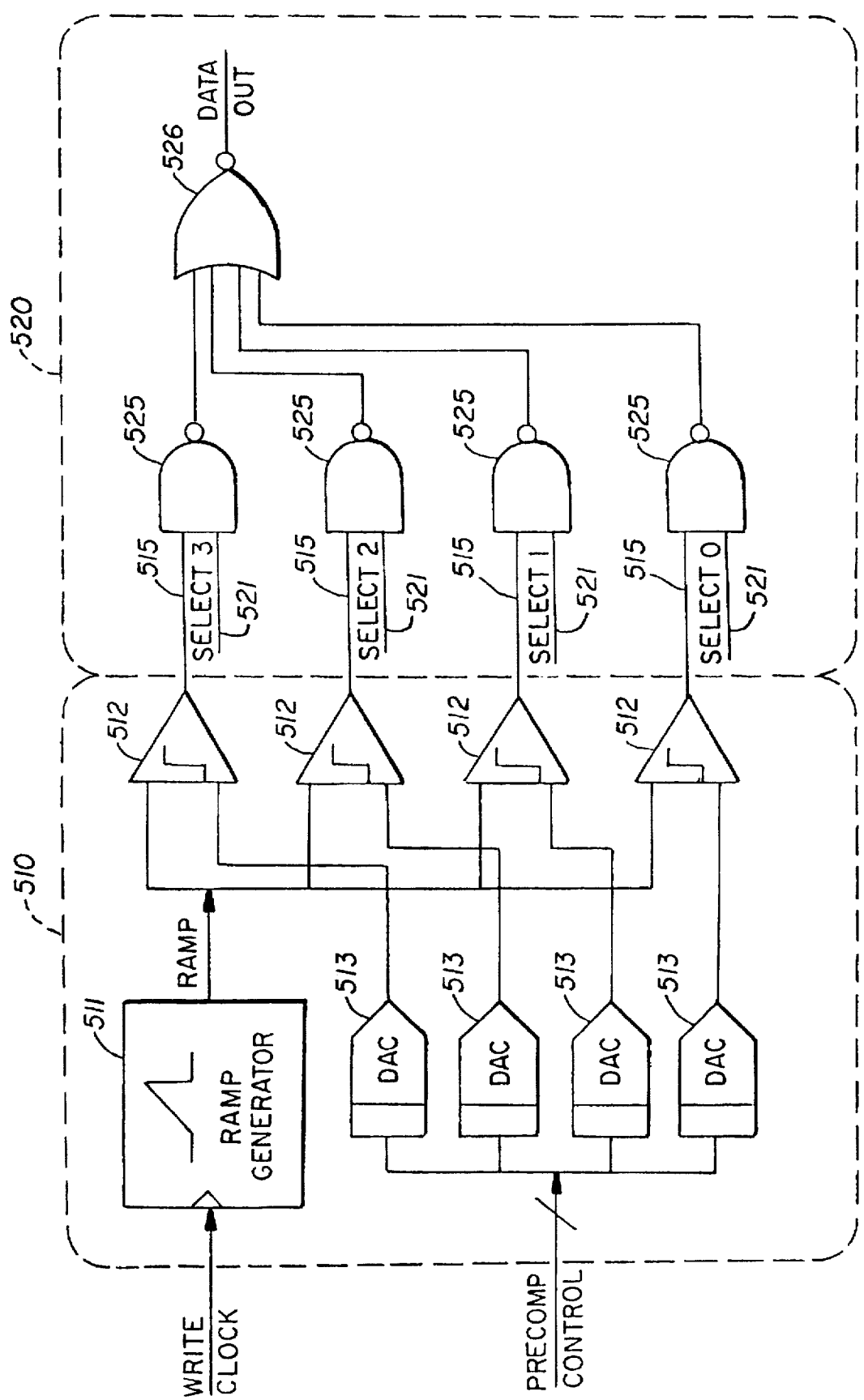
FIG. 5 is a schematic block diagram of the write precompensation circuit illustrated in FIG. 1.

FIG. 5 shows additional details of the write precompensation circuit 111 of the preferred embodiment. As shown in FIG. 5, the write precompensation circuit 111 is comprised of two parts: a mainly analog delay generator 510, and a mainly digital delay selector 520.

The delay generator 510 is used to generate four delayed versions of the write clock. As shown in FIG. 5, the write clock is used as input to start a ramp generator 511 which drives four comparators 512. Each comparator 512 has a corresponding digital-to-analog converter (DAC) 513. Each comparator 512 receives the ramp signal from the ramp generator 511 and compares it to the output of its corresponding digital-to-analog converter (DAC) 513. Each comparator 512 generates an edge, or delayed write clock 515, when the ramp voltage is equal to the output of its associated DAC 513. Thus, each DAC 513 controls the delay from the write clock to the output of its associated comparator 512. The digital inputs to the DACs 513 are controlled through the microprocessor interface 116.

From FIG. 5, the delay selector 520 comprises a shift register (not shown), which contains the current and past data sent to the disk, and a decoder which, depending on the presence or absence of a transition in the last two data points, enables one of four select lines 521. These select lines 521 select one of the four delayed write clocks 515 from the delay generator 510. The encoded signal 161 from the scrambler/encoder 110 is then output to a separate preamplifier and write head with suitable advancement or delay to limit the non-linear ISI due to magnetic domain wall interactions.

The aforementioned detailed description of the analog implementation of a partial response maximum likelihood (PRML) read channel 100 encompasses the minimum necessary components for building a functional read/write channel in accordance with the present invention. The preferred embodiment also contemplates the additional components for servo control used in positioning the read/write head. The servo control components include a position error sensor 113 for determining the position of the head over the track, an analog-to-digital converter (ADC) 115 for converting the analog error signal produced by the position error sensor 113 into readable information by a microprocessor interface 116, the microprocessor interface 116 for adjusting the position of the read/write head according to the position error signal, and a digital-to-analog converter (DAC) 117 for converting the adjustment determined by the microprocessor interface 116 into an analog signal to which the servo responds. Additionally, a serial interface 118 for parameter programming and debugging, and a test port 119 is also contemplated. Each of these components are well-known in the art, and may be implemented according to conventional methods.

In the preferred embodiment of the analog implementation of the partial response maximum likelihood (PRML) read channel 100, the entire read channel, including each functional block, is embodied within a single compact chip package. The preferred embodiment is fully integrated, having performance improvements by a factor of 2, power consumption reduction by a factor of 2, and space reduction by a factor of 3. In one embodiment, system performance of 100 Mb/sec is anticipated; 62.5 Mb/sec was actually achieved, but limited only by test equipment. In this same embodiment, power dissipation is less than 1 W, and the die size is 7×7 mm².

In addition, the preferred embodiment is implemented entirely in CMOS. Usually, analog integrated circuits are implemented in BiCMOS. The additional bipolar transistor allows more design flexibility and potentially more speed. The present invention demonstrates that BiCMOS implementation is unnecessary. CMOS circuits have the advantages that they are easier to fabricate than BiCMOS, and are often smaller.

Based upon the foregoing detailed description, the present invention provides a fully analog CMOS implementation of PRML technology for improved system speed, lower power consumption and a smaller surface area.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. An analog partial response maximum likelihood (PRML) read channel for use in a magnetic recording device, comprising:

a variable gain amplifier for receiving a preamplified electronic signal corresponding to a magnetic signal detected on a magnetic media, and for applying a bias voltage for adjusting the level of said preamplified electronic signal to produce an adjusted preamplified electronic signal;

a lowpass filter for filtering channel noise from said adjusted preamplified electronic signal to produce a filtered signal;

an analog equalizer for receiving and smoothing the high-frequency components of the filtered signal to produce an equalized signal;

a clock recovery circuit for synchronizing a read clock with the equalized signal;

an analog Viterbi detector for receiving said equalized signal and producing a detected signal using maximum-likelihood sequence estimation; and a decoder/descrambler for receiving and decoding said detected signal to produce a reconstructed data signal; and wherein said read channel is implemented entirely within a single integrated circuit.

2. The read channel of claim 1, wherein said integrated circuit is fabricated in CMOS.

3. The read channel of claim 1, wherein said analog equalizer comprises an analog delay line for sampling the filtered signal, said analog delay line comprising a plurality of successive delay stages and producing at the output of each delay stage a delayed representation of the filtered signal; and an analog feedforward equalizer (FFE) for producing an equalized signal based on said delayed representations.

4. The read channel of claim 3, said analog delay line comprising an analog bucket brigade delay line with negative feedback.

5. The read channel of claim 3, said analog feedforward equalizer (FFE) comprising an analog finite impulse response (FIR) filter.

6. The read channel of claim 5, said analog finite impulse response (FIR) filter generating an equalized signal, comprising:

a plurality of adjustable-coefficient multipliers for receiving the delayed representations from said analog delay line, each of said adjustable-coefficient multipliers having an associated weighting coefficient and receiving one each of said delayed representations, and whereby each adjustable-coefficient multiplier computes the product of its associated weighting coefficient and its received delayed representation;

a summer for receiving the products computed by each of said adjusted-coefficient multipliers and generating the sum of the combined products to produce the equalized signal.

7. The read channel of claim 3, said analog feedforward equalizer (FFE) 105 being adaptive.

8. The read channel of claim 3, said analog feedforward equalizer (FFE) comprising an adaptive finite impulse response (FIR) filter.

9. The read channel of claim 8, said analog finite impulse response (FIR) filter, comprising:

a plurality of adjustable-coefficient multipliers for receiving the delayed representations from said analog delay line, each of said adjustable-coefficient multipliers having an associated weighting coefficient and receiving one each of said delayed representations, and whereby each adjustable-coefficient multiplier computes the product of its associated weighting coefficient and its received delayed representation;

a summer for receiving each of said computed products and for generating the equalized signal by taking the sum said products;

a decision circuit for receiving said equalized signal and for generating a quantified signal;

a comparator for receiving said quantified signal and said equalized signal, and for computing an error signal by computing the difference of said input equalized signal and said input quantified signal;

an adaption rate multiplier for receiving said error signal and generating an adaption rate signal by adjusting said input error signal by an error adaption rate;

a plurality of error multipliers, each error multiplier being associated with one each of said adjustable-coefficient multipliers, and receiving as input the delayed signal representation from its immediately succeeding delay stage to compute and produce an error product signal;

a plurality of integrators, each integrator being associated with one each of said error multipliers and to the corresponding adjustable-coefficient multiplier associated with said error multiplier, and receiving as input the error product signal from its associated error multiplier to generate an integrated signal, wherein said integrated signal is input to said corresponding adjustable-coefficient multiplier for adjusting the associated weighting coefficient.

10. An analog partial response maximum likelihood (PRML) read/write channel for use in a magnetic recording device, comprising:

a variable gain amplifier for receiving a preamplified electronic signal corresponding to a magnetic signal detected on a magnetic media, and for applying a bias voltage for adjusting the level of said preamplified electronic signal to produce an adjusted preamplified electronic signal;

a lowpass filter for filtering channel noise from said adjusted preamplified electronic signal to produce a filtered signal;

an analog equalizer for receiving and smoothing the high-frequency components of the filtered signal to produce an equalized signal;

a clock recovery circuit for synchronizing a read clock with the equalized signal;

an analog Viterbi detector for receiving said equalized signal and producing a detected signal using maximum-likelihood sequence estimation; and a decoder/descrambler for receiving and decoding said detected signal to produce a reconstructed data signal; and a scrambler/encoder for receiving input data to be recorded on said magnetic media and for generating an encoded signal;

a clock synthesis circuit for generating a write clock for synchronous transmission of the encoded signal to said magnetic media;

a write precompensation circuit for receiving said encoded signal and said write clock and for synchronously sending said encoded signal to an output port while compensating for non-linear intersymbol interference; and wherein said read channel is implemented entirely within a single integrated circuit.

11. The analog read/write channel of claim 10, wherein said integrated circuit is fabricated in CMOS.

12. The analog read/write channel of claim 10, wherein said analog equalizer comprises an analog delay line for sampling the filtered signal, said analog delay line comprising a plurality of successive delay stages and producing at the output of each delay stage a delayed representation of the filtered signal; and an analog feedforward equalizer (FFE) for producing an equalized signal based on said delayed representations.

13. The analog read/write channel of claim 12, said analog delay line comprising an analog bucket brigade delay line with negative feedback.

14. The analog read/write channel of claim 12, said analog feedforward equalizer (FFE) comprising an analog finite impulse response (FIR) filter.

15. The analog read/write channel of claim 14, said analog finite impulse response (FIR) filter, comprising:

a plurality of adjustable-coefficient multipliers for receiving the delayed representations from said analog delay line, each of said adjustable-coefficient multipliers having an associated weighting coefficient and receiving one each of said delayed representations, and whereby each adjustable-coefficient multiplier computes the product of its associated weighting coefficient and its received delayed representation;

a summer for receiving the products computed by each of said adjusted-coefficient multipliers and generating the sum of the combined products to produce the equalized signal.

16. The analog read/write channel of claim 12, said analog feedforward equalizer (FFE) being adaptive.

17. The analog read/write channel of claim 12, said analog feedforward equalizer (FFE) comprising an adaptive analog finite impulse response (FIR) filter.

18. The analog read/write channel of claim 17, said adaptive analog finite impulse response (FIR) filter, comprising:

a plurality of adjustable-coefficient multipliers for receiving the delayed representations from said analog delay line, each of said adjustable-coefficient multipliers having an associated weighting coefficient and receiving one each of said delayed representations, and whereby each adjustable-coefficient multiplier computes the product of its associated weighting coefficient and its received delayed representation;

a summer for receiving each of said computed products and for generating the equalized signal by taking the sum said products;

a decision circuit for receiving said equalized signal and for generating a quantified signal;

a comparator for receiving said quantified signal and said equalized signal, and for computing an error signal by computing the difference of said input equalized signal and said input quantified signal;

an adaption rate multiplier for receiving said error signal and generating an adaption rate signal by adjusting said input error signal by an error adaption rate;

a plurality of error multipliers, each error multiplier being associated with one each of said adjustable-coefficient multipliers, and receiving as input the delayed signal representation from its immediately succeeding delay stage to compute and produce an error product signal;

a plurality of integrators, each integrator being associated with one each of said error multipliers and to the corresponding adjustable-coefficient multiplier associated with said error multiplier, and receiving as input the error product signal from its associated error multiplier to generate an integrated signal, wherein said integrated signal is input to said corresponding adjustable-coefficient multiplier for adjusting the associated weighting coefficient.

19. The analog read/write channel of claim 10, further comprising servo circuitry for tracking capability.

20. The analog read/write channel of claim 19, wherein said servo circuitry comprises:

a position error sensor for receiving said filtered signal and for determining and producing an analog position error signal;

an analog-to-digital converter for receiving and converting said analog position error signal to a digital position error signal;

a microprocessor interface for receiving said digital position error signal and for generating a digital servo adjustment signal;

a digital-to-analog converter for receiving and converting said digital servo adjustment signal to an analog servo adjustment signal; and an output servo port wherein said analog servo adjustment signal is made accessible for external mechanical servo control.

21. An analog partial response maximum likelihood (PRML) read/write channel for use in a magnetic recording device, comprising:

a variable gain amplifier for receiving a preamplified electronic signal corresponding to a magnetic signal detected on a magnetic media, and for applying a bias voltage for adjusting the level of said preamplified electronic signal to produce an adjusted preamplified electronic signal;

a lowpass filter for filtering channel noise from said adjusted preamplified electronic signal to produce a filtered signal;

an analog delay line for sampling and delaying successive representations of said filtered signal, said analog delay line comprising an analog bucket brigade delay line with negative feedback;

an adaptive analog finite impulse response (FIR) filter, comprising a plurality of adjustable-coefficient multipliers for receiving the delayed representations from said analog delay line, each of said adjustable-coefficient multipliers having an associated weighting coefficient and receiving one each of said delayed representations, and whereby each adjustable-coefficient multiplier computes the product of its associated weighting coefficient and its received delayed representation;

a summer for receiving each of said computed products and for generating the equalized signal by taking the sum said products;

a decision circuit for receiving said equalized signal and for generating a quantified signal;

a comparator for receiving said quantified signal and said equalized signal, and for computing an error signal by computing the difference of said input equalized signal and said input quantified signal;

an adaption rate multiplier for receiving said error signal and generating an adaption rate signal by adjusting said input error signal by an error adaption rate;

a plurality of error multipliers, each error multiplier being associated with one each of said adjustable-coefficient multipliers, and receiving as input the delayed signal representation from its immediately succeeding delay stage to compute and produce an error product signal; and a plurality of integrators, each integrator being associated with one each of said error multipliers and to the corresponding adjustable-coefficient multiplier associated with said error multiplier, and receiving as input the error product signal from its associated error multiplier to generate an integrated signal, wherein said integrated signal is input to said corresponding adjustable-coefficient multiplier for adjusting the associated weighting coefficient;

a clock recovery circuit for synchronizing a read clock with the equalized signal;

an analog Viterbi detector for receiving said equalized signal and producing a detected signal using maximum-likelihood sequence estimation; and a decoder/descrambler for receiving and decoding said detected signal to produce a reconstructed data signal; and a scrambled/encoder for receiving input data to be recorded on said magnetic media and for generating an encoded signal;

a clock synthesis circuit for generating a write clock for synchronous transmission of the encoded signal to said magnetic media;

a write precompensation circuit for receiving said encoded signal and said write clock and for synchronously sending said encoded signal to an output port while compensating for non-linear intersymbol interference; and wherein said read channel is implemented entirely within a single CMOS integrated circuit.

22. An analog partial response maximum likelihood (PRML) read/write channel for use in a magnetic recording device, comprising:

a variable gain amplifier for receiving a preamplified electronic signal corresponding to a magnetic signal detected on a magnetic media, and for applying a bias voltage for adjusting the level of said preamplified electronic signal to produce an adjusted preamplified electronic signal;

a lowpass filter for filtering channel noise from said adjusted preamplified electronic signal to produce a filtered signal;

an analog delay line for sampling said filtered signal, said analog delay line comprising a plurality of successive delay stages and producing at the output of each delay stage a delayed representation of the filtered signal, said analog delay line comprising an analog bucket brigade delay line with negative feedback;

an adaptive analog finite impulse response (FIR) filter, comprising a plurality of adjustable-coefficient multipliers for receiving the delayed representations from said analog delay line, each of said adjustable-coefficient multipliers having an associated weighting coefficient and receiving one each of said delayed representations, and whereby each adjustable-coefficient multiplier computes the product of its associated weighting coefficient and its received delayed representation;

a summer for receiving each of said computed products and for generating the equalized signal by taking the sum said products;

a decision circuit for receiving said equalized signal and for generating a quantified signal;

a comparator for receiving said quantified signal and said equalized signal, and for computing an error signal by computing the difference of said input equalized signal and said input quantified signal;

an adaption rate multiplier for receiving said error signal and generating an adaption rate signal by adjusting said input error signal by an error adaption rate;

a plurality of error multipliers, each error multiplier being associated with one each of said adjustable-coefficient multipliers, and receiving as input delayed signal representation from its immediately succeeding delay stage to compute and produce an error product signal; and a plurality of integrators, each integrator being associated with one each of said error multipliers and to the corresponding adjustable-coefficient multiplier associated with said error multiplier, and receiving as input the error product signal from its associated error multiplier to generate an integrated signal, wherein said integrated signal is input to said corresponding adjustable-coefficient multiplier for adjusting the associated weighting coefficient;

a clock recovery circuit for synchronizing a read clock with the equalized signal;

an analog Viterbi detector for receiving said equalized signal and producing a detected signal using maximum-likelihood sequence estimation; and a decoder/descrambler for receiving and decoding said detected signal to produce a reconstructed data signal; and a scrambler/encoder for receiving input data to be recorded on said magnetic media and for generating an encoded signal;

a clock synthesis circuit for generating a write clock for synchronous transmission of the encoded signal to said magnetic media;

a write precompensation circuit for receiving said encoded signal and said write clock and for synchronously sending said encoded signal to an output port while compensating for non-linear intersymbol interference; and servo circuitry for tracking capability, comprising a position error sensor for receiving said filtered signal and for determining and producing an analog position error signal;

an analog-to-digital converter for receiving and converting said analog position error signal to a digital position error signal;

a microprocessor interface for receiving said digital position error signal and for generating a digital servo adjustment signal;

a digital-to-analog converter for receiving and converting said digital servo adjustment signal to an analog servo adjustment signal; and an output servo port wherein said analog servo adjustment signal is made accessible for external mechanical servo control; and wherein said read channel is implemented entirely within a single CMOS integrated circuit.

* * * * *